United States Patent [19]
Daws et al.

[11] Patent Number: 5,989,467
[45] Date of Patent: *Nov. 23, 1999

[54] CERAMIC FOAM PRECURSOR RESIN COMPOSITION

[75] Inventors: David Eric Daws, Westminster; Nicholas T. Castellucci, Lomita; Harry Wellington Carpenter, Fallbrook; Mary Wagner Colby, Whittier, all of Calif.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,779

[22] Filed: Mar. 4, 1997

Related U.S. Application Data

[62] Division of application No. 08/515,928, Aug. 16, 1995, Pat. No. 5,643,512.

[51] Int. Cl.⁶ .................................................. B29C 65/00
[52] U.S. Cl. ............................... 264/43; 264/44; 264/49; 264/105; 501/39; 501/80; 501/82; 501/84; 501/87; 501/90; 521/61; 521/62; 521/63; 521/154; 521/180; 521/919; 252/500; 252/511
[58] Field of Search .................................. 264/43, 44, 49, 264/105; 501/80, 82, 84, 87, 90, 39; 521/61, 62, 63, 154, 180, 919; 252/500, 511

[56] References Cited

U.S. PATENT DOCUMENTS

| | | |
|---|---|---|
| 3,127,373 | 3/1964 | Guttag ...................................... 521/180 |
| 3,567,807 | 3/1971 | Shannon ...................................... 501/82 |
| 3,634,569 | 1/1972 | Emanuelson et al. . |
| 3,749,591 | 7/1973 | Hider et al. . |
| 4,016,229 | 4/1977 | Tobin ........................................ 501/80 |
| 4,031,059 | 6/1977 | Strauss . |
| 4,647,500 | 3/1987 | George et al. . |
| 4,801,484 | 1/1989 | Yao et al. . |
| 4,897,170 | 1/1990 | Chandramouli .......................... 264/105 |
| 5,083,127 | 1/1992 | Frye et al. . |
| 5,358,910 | 10/1994 | Atwell et al. .............................. 501/80 |
| 5,530,081 | 6/1996 | Nover ........................................ 501/80 |
| 5,556,901 | 9/1996 | Bryson ...................................... 501/90 |
| 5,613,188 | 3/1997 | Piech et al. . |
| 5,676,745 | 10/1997 | Kelly et al. . |
| 5,736,619 | 4/1998 | Kane et al. . |

*Primary Examiner*—Stanley S. Silverman
*Assistant Examiner*—Michael P. Colaianni
*Attorney, Agent, or Firm*—Terry J. Anderson; Karl J. Hoch, Jr.

[57] ABSTRACT

The present invention is embodied in a ceramic foam made by mixing a liquid pre-ceramic resin and a liquid phenolic resin, allowing the resultant mixture to chemically foam, curing the mixture for a time and at a temperature sufficiently to convert the mixture to a polymeric foam, and then heating the resultant polymeric foam for a time and at a temperature sufficient to break-down polymers of the polymeric foam and convert the polymeric foam to a ceramic foam. The ceramic foam of the present invention contains residual decomposed components of the liquid phenolic resin and/or liquid pre-ceramic resin.

5 Claims, 2 Drawing Sheets

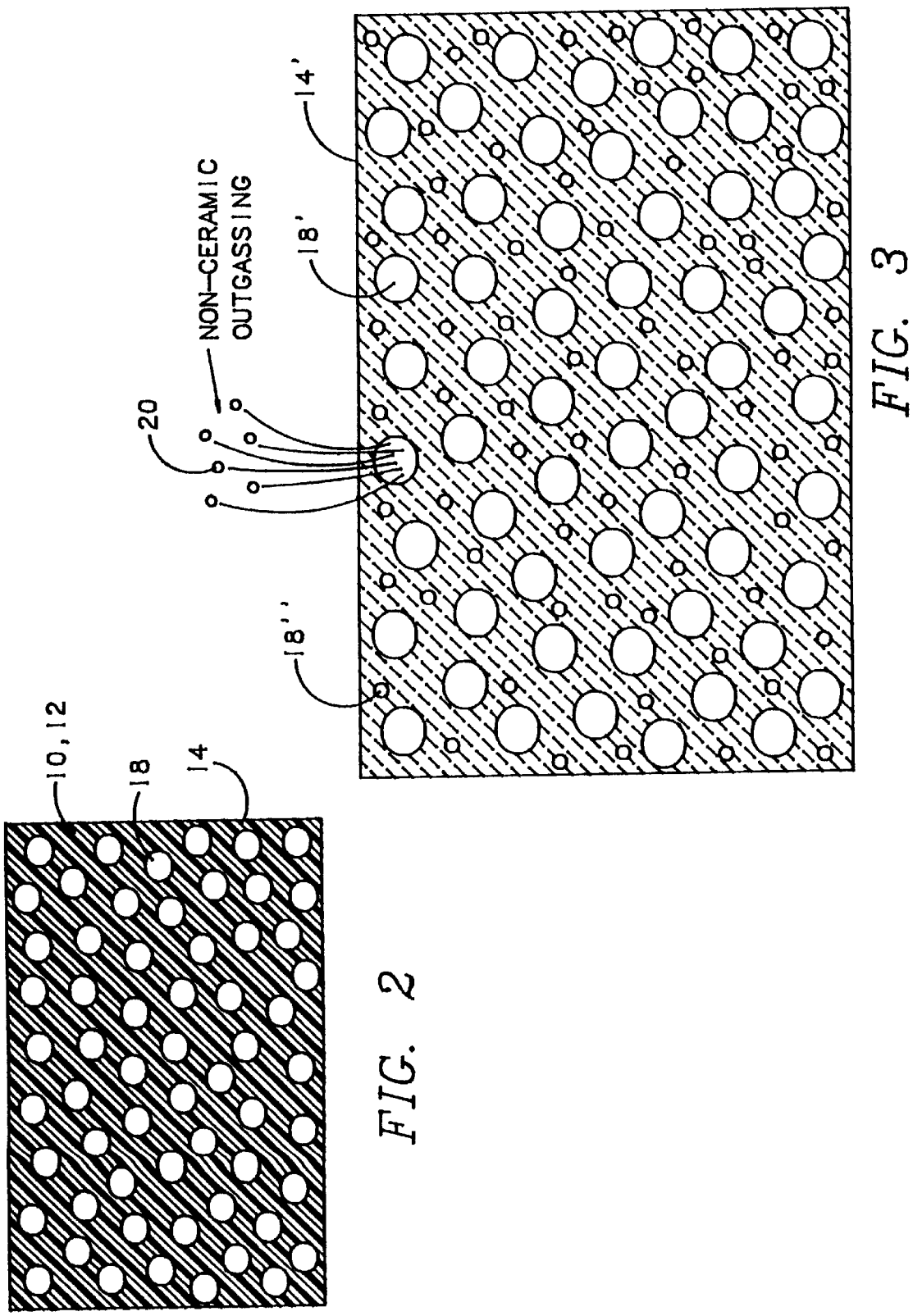

CERAMIC FOAM PRECURSOR RESIN COMPOSITION

This is a division of application Ser. No. 08/515,928, filed Aug. 16, 1995, U.S. Pat. No. 5,643,512.

BACKGROUND OF THE INVENTION

1. Technical Field

This invention relates to foam materials and, more particularly to a ceramic foam. It also relates to a method of producing a ceramic foam comprising the steps of creating a foam from a pre-ceramic resin; and, heating the resultant resin foam for a time and at a temperature which converts the pre-ceramic resin to a ceramic.

2. Background Art

Various foam materials are known in the art. There are flexible foams such as foam rubber and solid foams such as polystyrene foam. There are closed cell foams, such as polystyrene, which do not absorb water and similar liquids and, therefore, float. There are open cell foams, such as foam rubber, which absorb water and, therefore, are more useful as sponges than as floats.

All the various foams known in the prior art are high temperature intolerant. That is, if heated to high temperatures, they lose their structure, melt, burn, and disintegrate. Thus, they are not useful for such applications as, for example, catalytic converter substrates or for structural applications.

Ceramic materials are able to withstand temperatures that most metals cannot tolerate. It would, also, be desirable to have a way of making an open cell ceramic foam, although closed cell foams can be desirable as well.

Wherefore, it is an object of the present invention to provide a foam material and method of making it which is tolerant to high temperatures such as would be encountered in a catalytic converter of an internal combustion engine or for a structural application.

It is another object of the present invention to provide a foam material made of ceramic and a method of producing it.

It is still another object of the present invention to provide an open and/or closed cell foam material made of ceramic and a method of producing it which is particularly useful as a substrate for the catalyst material in an automotive catalytic converter or for structural application.

Other objects and benefits of this invention will become apparent from the description which follows hereinafter when read in conjunction with the drawing figures which accompany it.

SUMMARY OF THE DISCLOSURE

The foregoing objects have been achieved by the method of producing a ceramic foam of the present invention comprising the steps of, creating a foam from a pre-ceramic resin; and, heating the resultant resin foam for a time and at a temperature which converts the pre-ceramic resin to a ceramic.

In the preferred embodiment, the step of creating a foam from a pre-ceramic resin comprises mixing a liquid pre-ceramic resin with a liquid phenolic resin, and allowing the resultant mixture to chemically foam and set while the step of heating the resultant resin foam for a time and at a temperature which converts the pre-ceramic resin to a ceramic comprises heating the resultant resin foam for a time and at a temperature which converts the pre-ceramic resin to a ceramic and out-gasses the phenolic resin via a post-pyrolysis oxidation treatment.

The method may also include the additional step of mixing an additive material which imparts desired qualities to the resultant ceramic foam as part of the step of mixing a liquid pre-ceramic resin with a liquid phenolic resin. This may involve mixing carbon fibers with the liquid pre-ceramic resin with a liquid phenolic resin to make the resultant ceramic foam electrically conductive or mixing iron-based particles, for example, with the liquid pre-ceramic resin and liquid phenolic resin to make the resultant ceramic foam magnetic.

For strength of the resultant ceramic foam, the step of mixing a liquid pre-ceramic resin with a liquid phenolic resin comprises mixing at least 50% of the liquid pre-ceramic resin with the phenolic resin by weight. Superior strength is achieved by mixing at least 70% of the liquid pre-ceramic resin with the phenolic resin by weight.

BRIEF DESCRIPTION OF THE DRAWINGS

FIG. 2 is a simplified cross section through a piece of the foam material produced by the present invention in its resin state before the resin has been converted to a ceramic.

FIG. 3 is a simplified cross section through a piece of the foam material produced by the present invention in after the resin has been converted to a ceramic and showing how non-ceramic components are outgassed and the pores enlarged by the heating process.

DETAILED DESCRIPTION OF THE PREFERRED EMBODIMENT

Figure 1:
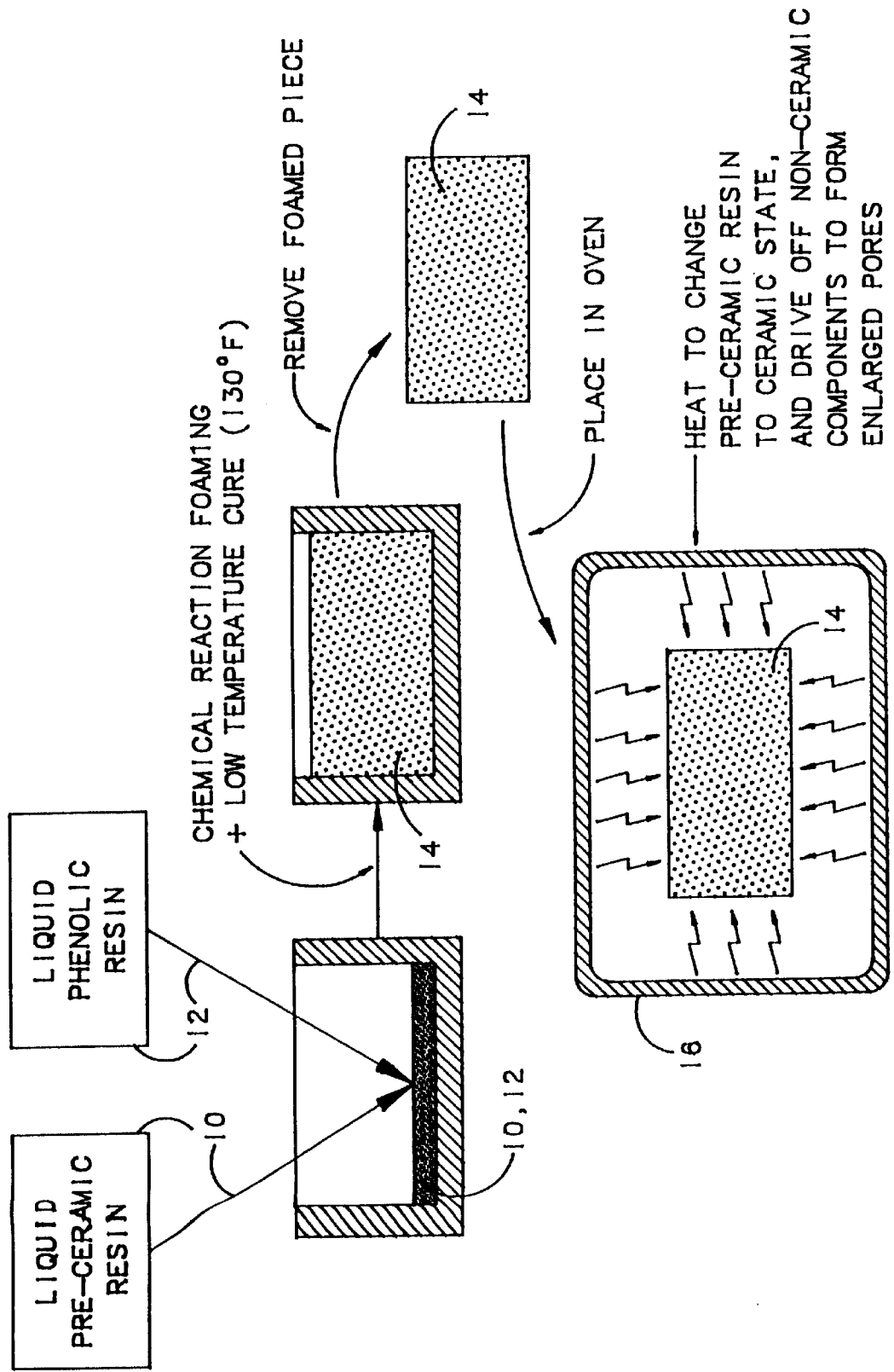
FIG. 1 is a simplified functional diagram of the steps of the present invention in one approach to producing a ceramic foam according to the present invention.

As depicted in FIG. 1, the ceramic foam of the present invention is produced by mixing a liquid pre-ceramic resin 10 with a liquid phenolic resin 12. The mixture then self-foams to form an open and/or closed cell foam 14 which is a combination of the pre-ceramic resin 10 and the phenolic resin 12. The producing of a foam by such chemical process and the methods of accomplishing it are well known to those of ordinary skill in the art and, per se, form no part of the present invention. The point of novelty of this invention is the components employed and their ultimate conversion to a ceramic foam. Once the foam 14 has formed and set up via a low temperature cure (130° F.), it is moved to an oven 16 where it is heated at a series of times and temperatures as specified by the manufacturer of the liquid pre-ceramic resin 10 for converting the resin 10 to a ceramic.

In tested embodiments of the present invention, the preferred pre-ceramic resin 10 is one sold under the tradename Blackglas 489D by Allied-Signal Corporation. It has a viscosity close to that of water and, therefore, combines easily. Similarly, any of several phenolic resins can be used, but those made by the Crest Company have been used in the tested embodiments and are, therefore, preferred.

As depicted in the simplified drawing of FIG. 2, the foam 14 prior to heating is a mixture of the two resins 10, 12 and contains open and/or closed cell pores 18. While not shown in the drawing pictures in the interest of simplicity, the pores 18 may actually be interconnected since it can be an open cell structure. As depicted in FIG. 3, non-ceramic components 20 are out-gassed during the heating process which converts the pre-ceramic resin 10 to a ceramic foam 14'. In the process, the pores 18' are also enlarged and smaller micro-pores 18" are formed. In the embodiments tested to date, the results suggest internal pores 18' of approximately 0.5 mm to 5.6 mm in diameter and micro-pores 18" 4 μm to 20 μm in diameter.

During the heating process, approximately 20% of the pre-ceramic resin 10 is lost. The phenolic resin 12 is lost as the result of a post-process oxidation treatment which oxidizes the resultant carbon. Thus, the ceramic foam 14' comprises approximately 80% of the original resin 10. A series of tests were run at various resin ratios to determine the qualities of the foam 14' at different ratios. The results of those tests appear in Table A. The trend appears to indicate that the best foaming occurs at a pre-ceramic resin 10 to phenolic resin 12 ratio of greater than 50/50. The best qualitative strength values are at a pre-ceramic resin 10 to phenolic resin 12 ratio of greater than 70/30. The best qualitative results from inspection of the samples indicates that the 90/10 pre-ceramic resin 10 to phenolic resin 12 ratio provided the best ceramic foam sample relative to catalytic converter and/or structural use. That sample was subjected to 1,000° F. and 1,8000° F. air exposures to determine the resistance to high temperature oxidation. That data is listed in Table B. As can be seen from the table, the total weight loss(es) were not significant (likely due only to oxidative weight loss from carbon oxidation) and structural integrity was maintained.

TABLE A

Ceramic Foam Test Results

| Sample | C-resin | P-resin | Foamed | Strength | Pre | Post | Yield (wt. %) |
|---|---|---|---|---|---|---|---|
| A | 10% | 90% | Well | Weak | 19.90 | 8.47 | 42.6 |
| B | 20% | 80% | Massive | Weak | 20.10 | 9.28 | 46.2 |
| C | 30% | 70% | Mediocre | Solid | 19.93 | 10.46 | 52.5 |
| D | 40% | 60% | Mediocre | Strong | 20.11 | 11.42 | 56.8 |
| E | 50% | 50% | Mediocre | Strong | 20.11 | 12.37 | 61.5 |
| ER | 50% | 50% | Well | Strong | 20.16 | 12.30 | 61.0 |
| F | 60% | 40% | Well | Strong | 20.00 | 13.63 | 68.2 |
| G | 70% | 30% | Well | Solid | 20.20 | 14.41 | 71.3 |
| H | 80% | 20% | Well | Strong | 20.08 | 15.27 | 76.0 |
| I | 90% | 10% | Well | Solid | 20.16 | 16.18 | 80.3 |

TABLE B

Sample I Air Heating Test Results

| Sample | Temp. | Duration | Pre-oxid(g) | Post-oxid(g) | Chg. Wt. % |
|---|---|---|---|---|---|
| I | 1,000° F. | 10 hrs | 16.9212 | 15.9631 | −5.66 |
| I | 1,800° F. | 10 hrs | 15.9997 | 15.7006 | −1.87 |

As can be appreciated, the ratio of precursors chosen will be a function of each application and the desired qualities of the resultant ceramic foam. If the foam is unsupported, a stronger foam will be better able to withstand potential breakage forces. Within a housing such as a catalytic converter, the ratio of the foam can be such as to provide more pores and a lighter and weaker structure since the foam will be protected and not subjected to as many breakage forces. For a structural application such as in a composite sandwich structure, fewer pores 18' may be desired in order to form a mechanically stronger foam.

Example of Blackglas Resin Pyrolysis Process

Fabrication of a sealable container, such as a stainless steel box, capable of withstanding 1700° F. is required for the pyrolysis cycle in a standard furnace. In the alternative, an inert gas furnace could be used if available. The box should have two tubing connections, one on the bottom and one on the top to allow the box to be flooded with an inert gas. In this example, the foam is placed in the box, the box placed in a standard furnace, stainless steel tubing is connected to the lower connector on the box and to a supply of high purity argon or nitrogen. Any equivalent inert gas could, of course, be used. The argon is allowed to flow into the box, and out the top vent at a rate of 5–10 standard cubic feet per hour for the entire heat cycle, thus assuring the foam is totally enveloped in an inert environment. The furnace is closed and fired on the following basis:

A) Ramp to 300° F. at 223°/hour
B) Ramp to 900° F. at 43°/hour
C) Ramp to 1400° F. at 20°/hour
D) Ramp to 1600° F. at 50°/hour
E) Hold at 1600° F. for 4 hours
F) Ramp to 77° F. at −125°/hour There are a variety of heating schedules other than this one, given by way of example only, which will yield usable ceramic foam.

As those of ordinary skill in the art will readily recognize and appreciate, additives can be added to the components of chemically created foams to add specific qualities to the resultant foam. The ceramic foam of the present invention has the same ability. The only limitation is that the additives must be able to withstand the heating step which converts the pre-ceramic resin to ceramic without being outgassed with the other non-ceramic components; and, must be non-reactive with the starting precursors. Thus, for example, carbon fibers can be mixed into the pre-foamed mixture of pre-ceramic resin 10 and phenolic resin 12 to make the foam both stronger and electrically conductive. This could be useful when the foam 14' is used as a substrate within a catalytic converter, an electrode for a battery, or for a structural application. By immersing the ceramic foam substrate in an electroplating solution and connecting it as one electrode, the catalyst could be electroplated to the walls of the pores 18' and their interconnections. Electrically conductive ceramic foam could be useful as an EMI shielding material in certain applications. Adding particles of rare earths or an iron-based material will provide magnetic qualities to the ceramic foam 14' which could be useful in some applications. All these variations are to be considered as within the scope and spirit of the present invention and the claims appended hereto.

Wherefore, having thus described the present invention, what is claimed is:

1. A ceramic foam precursor resin composition comprising pre-ceramic resin, phenolic resin, and electrically conductive strengthening fibers mixed therein, wherein the respective resins comprise in relation to each other greater than about 50 wt. % up to 90 wt. % pre-ceramic resin, and greater than about 10 wt. % and less than 50 wt. % phenolic resin.

2. A ceramic foam precursor resin composition as claimed in claim 1 wherein pre-ceramic resin is greater than about 70 wt. % and phenolic resin is less than about 30 wt. %.

3. A ceramic foam precursor resin composition as claimed in claim 1 wherein the electrically conductive fibers are carbon fibers.

4. A ceramic foam precursor resin composition as claimed in claim 1 comprising in addition magnetically attractive particles mixed therein.

5. A ceramic foam precursor resin composition as claimed in claim 4 wherein the magnetically attractive particles are iron-base particles.

* * * * *